United States Patent [19]

Bowne

[11] Patent Number: 4,867,871

[45] Date of Patent: Sep. 19, 1989

[54] SEWAGE SYSTEM DISCHARGE PUMP MODULE

[76] Inventor: William C. Bowne, 2755 Warren, Eugene, Oreg. 97405

[21] Appl. No.: 281,700

[22] Filed: Dec. 9, 1988

[51] Int. Cl.⁴ .......................... C02F 1/00; F04B 49/04
[52] U.S. Cl. ....................................... 210/97; 210/170; 210/187; 210/258; 417/38; 417/40; 417/360
[58] Field of Search ............... 210/104, 170, 187, 258, 210/532.2, 744, 97; 417/36, 40, 422, 38, 360

[56] References Cited

U.S. PATENT DOCUMENTS

| | | | |
|---|---|---|---|
| 1,607,246 | 11/1926 | Duroin | 417/40 |
| 3,385,218 | 5/1968 | West | 417/40 |
| 3,875,051 | 4/1975 | Kovarik | 210/744 |
| 3,877,613 | 4/1975 | Alfvegren | 417/360 |
| 4,229,142 | 10/1980 | Ledall et al. | 417/38 |
| 4,308,000 | 12/1981 | Oakes | 417/360 |
| 4,339,231 | 7/1982 | Conery et al. | 417/422 |
| 4,348,158 | 9/1982 | Wood | 417/40 |
| 4,439,323 | 3/1984 | Ball | 210/744 |
| 4,564,041 | 1/1986 | Kramer | 417/360 |
| 4,594,153 | 6/1986 | Weis | 210/170 |
| 4,664,185 | 5/1987 | Barnard | 417/38 |

Primary Examiner—Richard V. Fisher
Assistant Examiner—Joseph Drodge
Attorney, Agent, or Firm—Chernoff, Vilhauer, McClung & Stenzel

[57] ABSTRACT

A waste water collection and discharge system includes a buried waste water collection container which receives solid and liquid waste through an inlet. A dry vault located outside the container has a closable entryway which permits access to the vault from above ground. A pump which fits in the vault has an inlet which receives waste water from a fluid inlet tube that extends into the collection container, and an outlet which passes waste water through a fluid outlet tube to a remote collection site. A level sensor senses the level of the waste water in the collection container and initiates and terminates operation of the pump to maintain the level within predetermined limits. The pump, motor, level sensor and motor control system are interconnected into a unitary module which can be placed into and removed from the vault from above. Quick release attachments are provided between the vault and the module, the pump inlet and the fluid inlet tube, the pump outlet and the fluid outlet tube, and in the sensor system and the electrical power line used to power the pump. All of these quick release attachments are accessible through the entryway in the vault, so that the pump/motor module cna quickly and easily be removed from and replaced back into the vault.

6 Claims, 2 Drawing Sheets

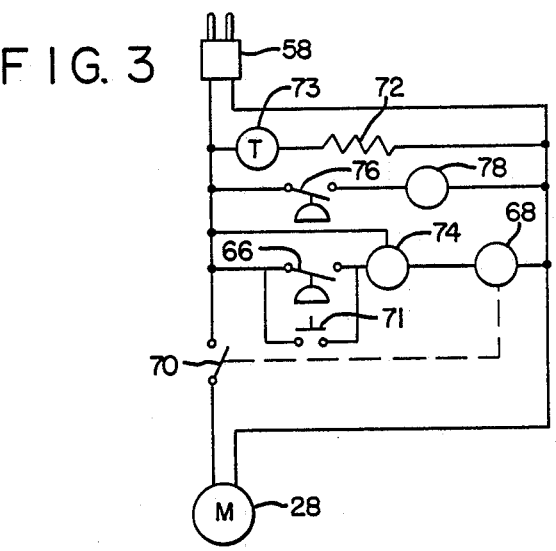
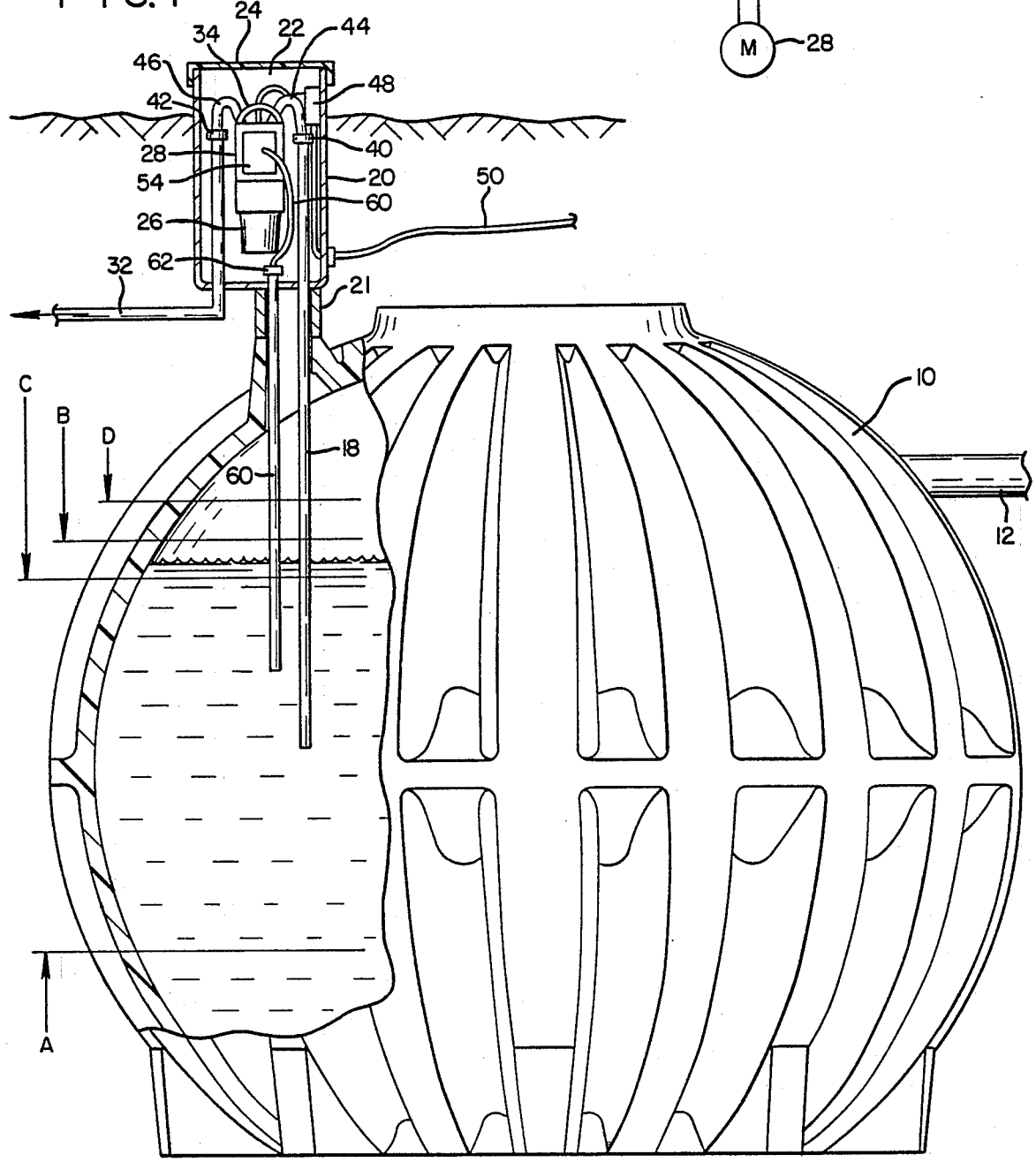

SEWAGE SYSTEM DISCHARGE PUMP MODULE

BACKGROUND AND SUMMARY OF THE INVENTION

This invention relates to a system for collecting and discharging waste water, and in particular to such a system in which the discharge pump, motor and controls are placed in a vault which is outside of the collection container and are removable from the vault quickly and easily as a unitary module.

In septic tank systems both solid and liquid waste are deposited into a below-ground collection container where the solids accumulate and decompose and the liquids are extracted. Since the bulk of the material which is deposited into the container is water, it often is necessary to mechanically pump a portion of the waste water out of the collection container to a separate holding tank, a remote drain field, or a treatment facility. A typical system in which waste water is pumped out of a collection container is disclosed in Ball, U.S. Pat. No. 4,439,323. The pumps used to transfer the waste water normally are submersed in the waste water to prevent the pump from freezing, to prevent loss of prime, and to cool the pump motor.

The difficulty with systems of this type is that when the pump malfunctions repairs must be made by entering the collection container itself so that the pump can be disconnected from its fluid and electrical connections and removed from the collection container. This is a time-consuming and hazardous task. The container contents are highly corrosive due to sulfuric acid, and the atmosphere is toxic and can be explosive. The service man is also exposed to electrical shock when maintaining such a traditional system.

Kovarik, U.S. Pat. No. 3,875,051 discloses a nonsubmerged pump for removing waste water from a collection chamber, which eliminates the necessity of entering the collection chamber to repair or remove the pump. However, although the actual element which requires repair can be removed from a separate housing, the repairman still must enter the housing, troubleshoot the system, determine which element or elements need to be repaired and then remove that element by disconnecting it from whatever other elements it interacts with. Thus, the repairman must be in the housing for a considerable time period even to remove an element for replacement or remote repair and install the replacement element.

The subject invention overcomes the foregoing shortcomings of the prior art devices of this type by providing a small underground watertight dry vault having an entryway at its top end with a cover which is easily opened. The pump, motor, and electrical controls are structurally interconnected into a unitary module which fits into the vault through the entryway. The pump/motor module is connectable to the side wall of the vault by a quick release coupling which is engaged merely by lowering the pump/motor module into the vault and is disengaged by lifting the module out of the vault. The pump inlet is connected through a quick-disconnect coupling to a fluid inlet tube which extends out of the vault and into the collection container. Similarly, the pump outlet is connected through a quick-disconnect coupling to a fluid outlet which extends out of the tank to the site to which the waste water is being pumped. Seals are provided where the fluid inlet tube and fluid outlet tube pass out of the vault to prevent ground water from entering the vault at these points. The vault is equipped with an electrical power outlet and the control system which operates the device has a power cord which can easily be attached to and detached from this power outlet.

The system also includes a level sensor which initiates operation of the pump when the fluid in the collection container reaches a first predetermined level and terminates operation when the fluid drops to a second predetermined level. In a preferred embodiment the level sensor includes a sensing tube which extends from mid-level in the collection container to a pressure sensitive switch located in the pump control system which is mounted on the pump/motor module. A seal is provided where the sensing tube passes into the vault and a quick disconnect coupling interfaces the sensing tube with the control system.

In the event of a failure of, or need to service, a component of the pumping system, the entire module, with all working parts including the pump, motor, sensing system and controls, can quickly and easily be removed from the vault for repair at a remote site and a new unit can be quickly installed in its place. This can be accomplished without having to enter the collection container, without requiring testing on-site to identify a faulty component, without removing components piecemeal, and without requiring any tools. All that is required to remove the module is to reach into the vault and uncouple the quick disconnects between the pump inlet and the fluid inlet tube, the pump outlet and the fluid outlet tube, the sensing tube and the control system, and the power cord and power outlet, respectively, and lift the module out of the vault. This procedure is reversed to install a new module and, since the module fits in place only one way, there is no danger of incorrect installation.

Accordingly, it is a principal object of the present invention to provide a waste water collection and discharge system in which the apparatus that is used to pump waste water out of the collection container can quickly and easily be installed or removed and replaced.

It is a further object of the present invention to provide such a system in which the entire system which is used to pump water is integrated into a unitary module to facilitate remote testing of all of the working parts.

It is a still further object of the present invention to provide such a system in which the module can be fitted into an enclosed watertight dry vault from ground level without the necessity of entering the waste water collection container.

It is a yet further object of the present invention to provide such a system in which all of the pumping and electrical lines contain quick release connectors which permit quick assembly and disassembly.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 1 is a side elevation view, partially broken away, of an exemplary waste water collection and discharge system embodying the features of the present invention.

FIG. 3 is a schematic diagram of an exemplary embodiment of the electrical control system which is used in the system of FIG. 1.

DETAILED DESCRIPTION OF THE INVENTION

Figure 2:
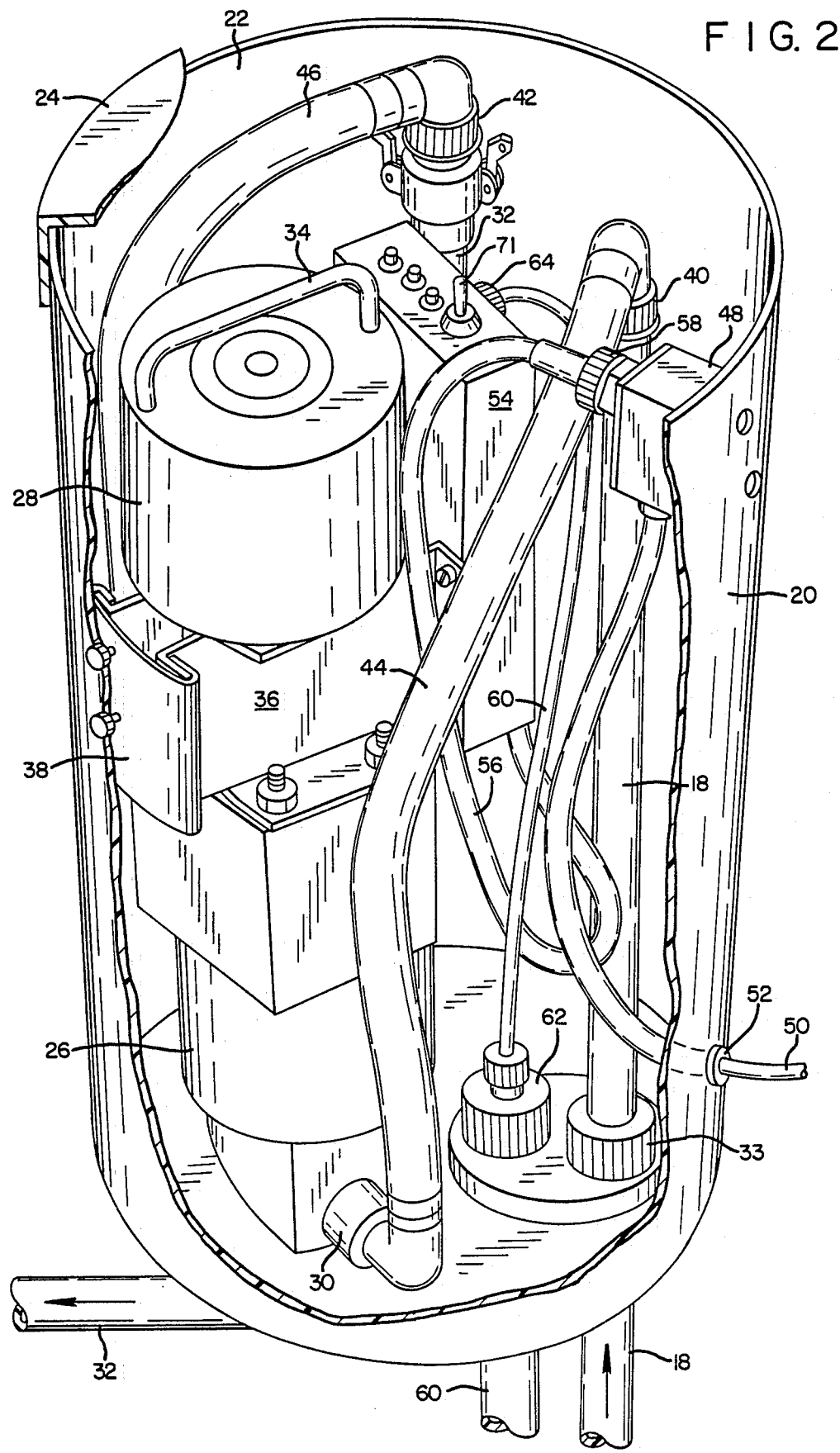
FIG. 2 is a perspective view, partially broken away, of the dry vault and pump assembly portion of the system of FIG. 1.

Referring to FIG. 1 of the drawings, the present invention includes an underground waste water collection container 10, such as that used in a septic tank system. The container has a waste water inlet 12 which is connected to the plumbing system serviced by the device, and a waste water outlet comprising a tube 18 for exhausting fluid to a waterproof dry vault 20 that is located outside of the container 10. Containers of this type generally receive waste solids as well as waste water and hold the solids while they decompose. These solids either settle to the bottom of the tank where they accumulate to a maximum level A, or they float at the surface of the water. Thus, the bottom of the tube 18 must be sufficiently below the lowest surface of the water that it will not pick up floating solids but sufficiently above the maximum solid level A so that it will not pick up settled solids.

Referring now also to FIG. 2, located above the container 10 immediately below the surface of the ground is a sealed vault 20 connected to the container 10 by a pipe 21. The vault 20 has an entryway 22 located at its upper end which opens out of the ground, and a removable cover 24 sealingly closing the entryway 22. The vault 20 preferably is located adjacent to the waste water outlet of the container 10 so that the vault's fluid inlet tube 18 is close by, but a more remote location connected to the container by longer underground tubes 18 and 60 may be employed alternatively. The vault contains a pump 26 that is driven by a motor 28 to remove waste water from the container periodically through tube 18. The pump 26 has an inlet 30 which is connected to the fluid inlet tube 18 and an outlet (not shown) which is connected to a fluid outlet tube 32 which passes out of the vault 20 and extends to a suitable disposal area. A watertight seal such as 33 is provided between both the fluid inlet tube and the fluid outlet tube and the vault to prevent ground water from entering the vault at these points. The motor 28 preferably is of the type which has a circuit breaker that opens when the motor becomes overheated. Thus, if the pump is of the progressive cavity type, the motor will shut off if the back pressure in the fluid outlet tube 32 becomes excessive. It may be desirable to place a pressure sensor (not shown) in the fluid outlet tube in order to immediately open a safety switch (not shown) which discontinues current to the motor when the back pressure reaches a predetermined level.

The pump 26 and motor 28 are structurally interconnected in a unitary module which can be moved as a unit, and a handle 34 on the assembly facilitates such movement. The pump/motor module has a bracket 36 mounted on its side which slidably engages a mating clip 38 which is mounted on the inside wall of the vault 20. The bracket and clip act as a quick release mount which permits the pump/motor module to be connected to or disconnected from the vault merely by inserting it into or pulling it out of the entryway 22.

To further facilitate installation and removal of the pump/motor module into and out of the vault, a quick disconnect coupling 40 is placed between the pump inlet 30 and the inlet tube 18, and a quick disconnect coupling 42 is placed between the pump outlet and the fluid outlet tube 32. Instead of the conventional toggle-type quick disconnect couplings shown in the drawings, other types of quick disconnect couplings could be used instead, such as a slide-away coupling in which an elastomeric seal provides a slidably detachable, sealed interconnection between two conduits. Since the pump inlet and outlet are located near the bottom of the pump/motor module where they are not easily accessible when the module is in the vault, the fluid inlet and outlet tubes 18 and 32, respectively, preferably extend to the top of the vault for easy access to the toggle-type couplings, and are connected to the pump inlet and outlet, respectively, by tubes 44 and 46. Such accessibility is not important if slide-away couplings are used. However, the vertical extension of the tubes 18 and 32 above the pump inlet and outlet also serves to maintain the priming of the pump.

Power for operating the motor 28 is supplied through a power outlet 48 which is mounted inside of the vault and receives power through a supply cord which passes out of the vault to a suitable power source. The power outlet 48 is located near the top of the vault in order to make it readily accessible through the entryway 22. A water-tight seal is provided between the supply cord 50 and the vault 20 by means of a grommet 52. The motor 28 is operated by a controller 54 which is attached to the pump/motor module and is movable with the module. A power cord 56, which extends from the controller, has a quick-release plug 58 located in its end which connects with the power outlet 48.

The controller includes a level sensor which initiates operation of the pump when the fluid level in the collection container 10 reaches a first predetermined level B and terminates operation of the pump when the fluid level drops to a second predetermined level C. The level sensor includes a trapped air pressure sensing tube 60 which extends out of the vault 20 into the container 10 and terminates below the fluid level C. A watertight seal 62 is provided between the sensing tube and the vault to prevent ground water from entering the vault, and a quick disconnect coupling 64 is provided between the sensing tube and the controller 54 near the entryway 22 for easy accessibility. The sensing tube is fluidly connected to a pressure activated switch 66 (FIG. 3) located in the controller and connected to a timer switch 74 which controls a pump motor relay 68. The switch 66 is calibrated to close when the pressure level in the sensor tube reaches a level which corresponds to the water in the container having reached level B. When the pump switch 66 is closed, the timer switch 74 also closes and power is provided to the relay 68 which closes a motor power switch 70. The timer 74 interrupts power to the motor 28 after a predetermined time that corresponds with the pump having removed sufficient fluid from the container so that the fluid level is at level C. (Alternately, the switch 66 could be a two-way pressure-activated switch which is calibrated to open when the pressure level in the sensing tube reaches a level which corresponds to the water having reached level C, thereby eliminating the timer switch 74.) A manual switch 71 permits the pump to be activated manually irrespective of the fluid level in the container.

Also connected to the sensing tube 60 is a pressure-activated alarm switch 76 (FIG. 3) which activates a high water alarm 78, such as a horn and/or light, when the waste water rises above level D in the container, which is above the level B where the pump should be activated. This serves as a warning that the pump system is not operating correctly. One potential problem which could make the sensor system fail to initiate operation of the pump would be plugging of the sensing tube 60 with solid waste. Also, vapor pressure can develop in the tube over time, causing drift of the level sensor's calibration. If these problems were to occur on a regular basis it might be necessary to connect the output of an air compressor to the sensing tube and periodically operate the compressor to inject pressurized air into the sensing tube and purge it of any accumulated solid waste. The compressor could be driven by the motor 28, and thus not require any further circuitry, or it could be powered through a timer to operate periodically. If the compressor is operated by the motor 28 it will be necessary to use a timer to terminate operation of the motor 28 since a dual-acting pressure switch could not be used for this purpose. Also, if a compressor is used to purge the sensing tube, it will be necessary to provide an override switch which prevents activation of the high water alarm when the compressor is in operation.

If the waste water collection and discharge system of the present invention is to be used in regions which experience below-freezing temperatures, it will be desirable to include a heating system to prevent waste water in the vault's pump and conduits from freezing when the pump is not operating. In the embodiment illustrated in FIG. 3, an electrical resistance heating element 72, which is controlled by a thermostat 73, is mounted on the controller 54 and draws power through the same power cord 56 that provides power to the motor 28. Alternatively, or in addition to the heating element 72, heat could be transferred from the interior of the waste water collection container 10 to the interior of the vault 20 by conduction through the tubes 18 and 60, and/or by convection to the bottom of the vault through the pipe 21 joining the vault 20 to the container 10. In such case the heat is primarily supplied by warm waste water entering the container 10 through the inlet 12. For maximum conduction, the tubes 18 and 60 are preferably constructed of a good heat conducting material such as metal. Although the interior of the vault 20 is sealed from the atmosphere of the container 10 to prevent the transfer of fumes, the convection through the pipe 21 warms the bottom of the vault to aid in freeze prevention.

Accordingly, all of the electrical and fluid lines associated with the pump/motor module (including the heater if one is provided) are easily disconnectable through the entryway 22 in the vault and the entire module can be lifted out of the vault for repair or replacement and set back into the vault when the repair is completed.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A waste water collection and discharge system comprising:
   (a) a waste water collection container having a waste water inlet and a waste water outlet;
   (b) a sealed watertight enclosure exterior of said waste water collection container having a selectively openable and closable entryway;
   (c) a fluid pump having a pump inlet and a pump outlet, and an electric motor drivingly connected to said pump, both located within said enclosure;
   (d) said enclosure having a fluid inlet means for interconnecting said pump inlet operatively with said waste water outlet of said collection container, fluid outlet means for interconnecting said pump outlet with the exterior of said enclosure, and an electrical power outlet for supplying electric current to said motor; and
   (e) quick-release detachable means for attaching said pump inlet and pump outlet with said fluid inlet means and fluid outlet means of said enclosure, respectively, and for connecting said motor to said electrical power outlet, all of said quick-release detachable means being detachable without requiring any tool so that said pump and motor can be quickly detached from said enclosure and removed therefrom through said entryway;
   (f) said pump and motor being structurally interconnected in a unitary module which is removable as a unit from said enclosure through said entryway. outlet means of said enclosure, respectively, and for connecting said motor to said electrical power outlet, said quick-release detachable means being detachable by access to the interior of said dry enclosure when said entryway is open so that said pump and motor can be quickly detached from said dry enclosure and removed therefrom through said entryway.

2. The apparatus of claim 1, further including an electric switch interposed operatively between said motor and said electrical power outlet, and level sensor means for sensing the level of waste water in said waste water collection container and controlling said switch in response to said level, both said switch and level sensor also being located within said enclosure, said enclosure further including means defining an aperture for connecting said level sensor operatively to said waste water collection container, said quick-release detachable means further including means for detachably connecting said switch to said electrical power outlet and said level sensor to said aperture so that said switch and level sensor can be quickly detached from said enclosure and removed therefrom through said entryway.

3. A waste water collection and discharge system comprising:
   (a) a waste water collection container having a waste water inlet and a waste water outlet;
   (b) a sealed watertight enclosure exterior of said waste water collection container having a selectively openable and closable entryway;
   (c) a fluid pump having a pump inlet and a pump outlet, and an electric motor drivingly connected to said pump, both located within said enclosure;
   (d) said enclosure having fluid inlet means for interconnecting said pump inlet operatively with said waste water outlet of said collection container, fluid outlet means for interconnecting said pump outlet with the exterior of said enclosure, and an electrical power outlet for supplying electric current to said motor;
   (e) an electric switch interposed operatively between said motor and said electrical power outlet, and level sensor means for sensing the level of waste water in said waste water collection container and controlling said switch in response to said level, both said switch and level sensor also being located within said enclosure, said enclosure further including means defining an aperture for connecting said level sensor operatively to said waste water collection container;

(f) quick-release detachable means for attaching said pump inlet and pump outlet with said fluid inlet means and fluid outlet means of said enclosure, respectively, and for connecting said motor to said electric power outlet, said quick-release detachable means further including means for detachably connecting said switch to said electrical power outlet and said level sensor to said aperture so that said pump, motor, switch and level sensor can be quickly detached from said enclosure and removed therefrom through said entryway;

(g) said pump, motor, switch and level sensor being structurally interconnected in a unitary module which is removable as a unit from said enclosure through said entryway.

4. The apparatus of claim 3, including quick-release mounting means for fixedly mounting said module as a unit detachably to the interior of said enclosure.

5. The apparatus of claim 3, further including means for heating said enclosure.

6. The apparatus of claim 5 wherein said means for heating comprises means for transferring heat from the interior of said waste water collection container to said enclosure.

* * * * *

UNITED STATES PATENT AND TRADEMARK OFFICE
CERTIFICATE OF CORRECTION

PATENT NO. : 4,867,871

DATED : September 19, 1989

INVENTOR(S) : William C. Bowne

It is certified that error appears in the above-identified patent and that said Letters Patent is hereby corrected as shown below:

Abstract, line 24   Change "cna" to --can--;

Col. 2,   line 11   Change "Ievel" to --level--;

Col. 4,   line 12   Insert --5-- between "inlet" and "and";

Col. 6,   lines 26-33   Delete these lines in their entirety.

Signed and Sealed this

Eighteenth Day of June, 1991

Attest:

HARRY F. MANBECK, JR.

Attesting Officer

Commissioner of Patents and Trademarks